United States Patent [19]

Korzeniowski et al.

[11] Patent Number: 5,255,806

[45] Date of Patent: Oct. 26, 1993

[54] REINFORCED PLASTIC COMPOSITE INTERMODAL VEHICLE HAULER

[75] Inventors: George Korzeniowski, Salt Lake City, Utah; William B. Goldsworthy, Palos Verdes, Calif.

[73] Assignee: Stoughton Composites, Inc., Springville, Utah

[21] Appl. No.: 695,599

[22] Filed: May 3, 1991

[51] Int. Cl.$^5$ ................................ B65D 7/30
[52] U.S. Cl. .................... 220/1.5; 220/665; 206/59.9
[58] Field of Search ............. 220/665, 1.5, 4; 206/509

[56] References Cited

U.S. PATENT DOCUMENTS

| | | | |
|---|---|---|---|
| 1,193,657 | 8/1916 | Zeek | 220/665 |
| 2,140,158 | 12/1938 | Knapp | 220/665 |
| 3,276,832 | 10/1966 | Reilly | 312/140 |
| 3,316,041 | 4/1967 | Nelson | 220/665 |
| 3,456,829 | 7/1969 | Glassmeyer | 220/1.5 |
| 3,561,633 | 2/1971 | Morrison et al. | 220/1.5 |
| 3,801,177 | 4/1974 | Fylling et al. | 312/351 |
| 3,815,517 | 6/1974 | Przybylinski | 105/368 R |
| 3,904,524 | 9/1975 | Pelton et al. | 210/94 |
| 3,955,702 | 5/1976 | Lundy | 220/665 |
| 4,090,903 | 5/1978 | Matsui | 156/211 |
| 4,144,984 | 3/1979 | Saunders | 220/1.5 |
| 4,258,520 | 3/1981 | Rehbein | 52/522 |
| 4,288,136 | 9/1981 | LeMer | 312/297 |
| 4,360,115 | 11/1982 | Saunders | 220/1.5 |
| 4,416,384 | 11/1983 | Bjurling | 220/1.5 |
| 4,428,491 | 1/1984 | Mittelmann et al. | 220/1.5 |
| 4,505,402 | 3/1985 | Gerhard | 220/1.5 |
| 4,576,017 | 3/1986 | Combs et al. | 62/372 |
| 4,614,278 | 9/1986 | Gerhard | 220/1.5 |
| 4,729,570 | 3/1988 | Welch, Jr. | 280/5 C |
| 4,793,519 | 12/1988 | Voorhies, Jr. | 220/465 |
| 4,836,411 | 6/1989 | Jones | 220/1.5 |
| 4,860,911 | 8/1989 | Jones, Sr. | 220/1.5 |
| 4,872,574 | 10/1989 | Lam | 220/1.5 |
| 4,881,859 | 11/1989 | Ehrlich | 410/29.1 |
| 4,905,822 | 3/1990 | Bosco | 206/45.34 |
| 4,930,661 | 6/1990 | Voorhies | 220/465 |
| 4,998,636 | 3/1991 | Hardigg | 22-/4.34 |
| 5,052,579 | 10/1991 | Boots | 220/403 |

*Primary Examiner*—Joseph Man-Fu Moy
*Attorney, Agent, or Firm*—Michael, Best & Friedrich

[57] ABSTRACT

An intermodal vehicle hauler, particularly, for the storage and transport of automotive vehicles such as passenger automobiles and the like. The vehicle hauler is generally rectangular in shape and is comprised of a pair of side walls, a roof and a floor, which are all made of a reinforced plastic composite materials. In a preferred embodiment, the side walls and even the roof may also be formed in a manner so that they are light translucent thereby enabling some light exposure to the interior of the vehicle hauler to facilitate loading and unloading of automotive vehicles.

12 Claims, 7 Drawing Sheets

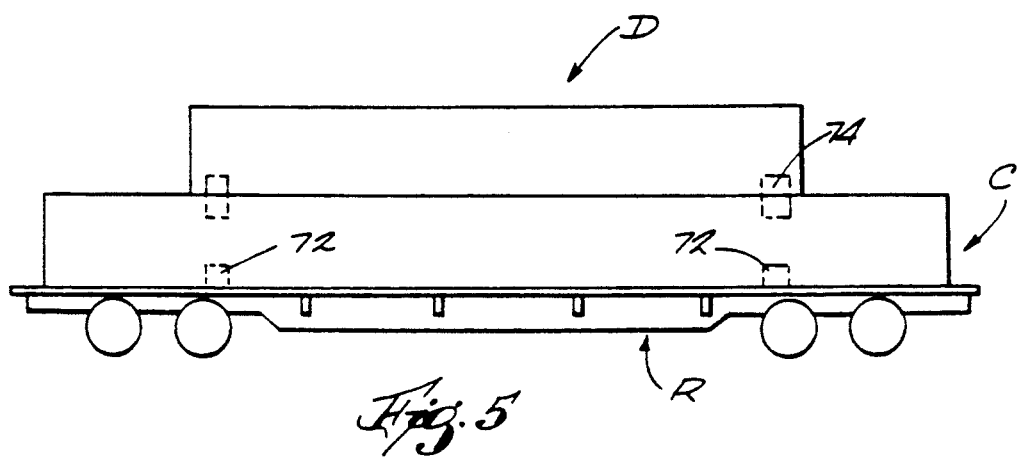

REINFORCED PLASTIC COMPOSITE INTERMODAL VEHICLE HAULER

BACKGROUND OF THE INVENTION

1. Field of the Invention

This relates in general to certain new and useful improvements in intermodal vehicle haulers, and more particularly, to intermodal vehicle haulers constructed substantially of reinforced plastic composite materials and which are strong in performance, light in weight and provide a safe and environmentally protected compartment for storage of automotive vehicles.

2. Brief Description of the Prior Art

Intermodal transport containers are highly effective for transporting of freight across continents via ocean going vessels and on land via railroad cars, particularly railroad flatbed cars and then to a particular destination by means of highway truck transport. In this way, the freight which is moved in the container is not unloaded between the source and the final destination. Intermodal transport containers are particularly effective where the freight being carried is not subject to environmental damage such as dust or corrosion damage and where the contents are not particularly attractive to thievery.

Heretofore, there have not been any intermodal vehicle haulers which are effective for use in the transporting of automotive vehicles, such as passenger automobiles. When the automobiles are manufactured or assembled on one continent and have a sales market destination on another continent, they must be loaded at a factory site onto railroad cars specifically designed for the movement of automotive vehicles and then transported to a loading site for shipment on an ocean going vessel. At this point, the automobiles must then be physically and individually driven off of these special railroad cars, which have a rack design with stacked tiers of platforms, and then onto a loading dock. The automobiles may then be driven from the loading dock up a ramp and onto an ocean going vessel or loaded by crane into a hold of an ocean going vessel.

When the automobiles reach the destination continent, they must then be unloaded from the ocean going vessel onto another storage dock where they are then destined for transport to a particular city. The automobiles are again individually driven onto a railroad car transported to a destination city. At this point, they are thus unloaded from the railroad car and loaded onto a highway or so-called "over the road" truck for transport to a particular local destination such as an automobile dealers sales lot. Again, at the particular specific destination, such as an automobile dealer sales lot, the automotive vehicles are again unloaded from the highway truck and stored at a storage location.

The costs involved in merely moving the vehicles from a factory site on one continent to a dealer's showroom on a second continent are quite considerable. It can be recognized that considerable manual intervention is required for purposes of loading and unloading automotive vehicles from on type of transport to another. In this process and due to the vast number of vehicles which must be loaded and unloaded, vehicle damage often results, thereby adding repair costs to the overall costs of manufacture and transport of the automotive vehicles.

Substantial environmental damage which often results to the transported automotive vehicles. When the vehicles are stored on ocean going vessels, the salt water environment not only initiates corrosion, particularly where there is a slight scratch in the paint or primer of the vehicle, but it also has a tendency to foul portions of the operating mechanism of the vehicles, if the vehicles are stored on the ship for any significant period of time. Accordingly, the ocean going ship or vessel must leave the shipping port and arrive almost directly at the destination port. This need for dispatch interferes with routing of other freight which may be carried on the ocean going vessel.

Transport by rail introduces a second set of problems which again materially adds to the cost of transport and hence, the overall price of an automotive vehicle. In many cases, where the vehicles are loaded onto railroad car haulers for inter-country movement, persons desiring to immigrate from one country to another will often break into and hide in the vehicle. Since customs agents at a border checkpoint do not have the facilities or time to examine every automotive vehicle transported on a railroad car, ingress into a particular country is relatively easy. In addition, the automobile serves as a convenient living quarters during the transport time and the occupant often damages the interiors of the vehicles.

One of the significant problems which arises in the transport of automotive vehicles, is the fact that the metal structure of the railroad cars rust and the rust flakes and deposits on the automotive vehicle. Ground dust which may include some metal particles or rust flakes is also spewed up by movement of the railroad cars and further deposits on the automotive vehicle. The deposited rust flakes and dust, cannot be merely washed from the vehicle and the special cleaning techniques which are required can often add as much as several hundred dollars per automotive vehicle for cleaning alone.

There have been several proposed intermodal vehicle haulers for use in transporting automotive vehicles. However, heretofore, all proposed intermodal vehicle haulers were to be constructed of metals, such as steel. This would materially and inevitably introduce a specific set of additional problems peculiar to the use of steel or other metal for any type of intermodal container. In this case, the flaking rust particles and spewed up dust would still result and prove to be an additional damage problem. Secondly, the weight of steel intermodal vehicle haulers would be quite substantial thereby resulting in increased shipping costs and overall costs to the vehicle. Further, the metal intermodal vehicle hauler would add to the vibration problem created by transport of the automotive vehicles on a railroad car hauler or on a truck transport. In many cases, the vibration can be excessive and result in damage to the components of the automotive vehicle. Thus, the metal intermodal vehicle haulers heretofore proposed would be relatively ineffective of relatively short life and result in high maintenance cost.

Exemplary of some of the intermodal vehicle haulers for automotive vehicles which have been proposed are those in U.S. Pat. No. 4,860,911, dated Aug. 29, 1989 to John L. Jones, Sr., U.S. Pat. No. 4,836,411, dated Jun. 6, 1989 to J. Leslie Jones, U.S. Pat. No. 4,144,984, dated Mar. 20, 1979 to George D. Saunders and U.S. Pat. No. 4,360,115, dated Nov. 23, 1982 to George D. Saunders.

The vehicle haulers described in these patents would inherently suffer from the disadvantages mentioned above. In addition, the vehicle haulers described in these patents present additional problems, such as the loading and unloading of automotive vehicles. Due to the fact that these proposed metal transport containers would necessarily have very dark interior compartments, the drivers of the automotive vehicles who are loading or unloading the vehicles must exercise due care to preclude the causing of damage to both the vehicle hauler and the automotive vehicle when driving the vehicle into and out of the container.

After the driver of the vehicle parks the vehicle in the intermodal container, it is necessary for the driver to exit from the vehicle in a relatively confined space without banging the door edge of the vehicle into the side wall of the auto hauling container. Thereafter, in this very dark environment, the driver must find the chalks for the vehicle wheels and place the chalks behind the rear wheels and in front of the front wheels. In some cases, it is necessary to tie-down the vehicles to the container itself. Not only does this present an attendant danger to the driver working in this relatively dark environment, but it also materially slows his or her ability to load or unload a vehicle, thereby resulting in substantially increased labor costs.

It would be impractical and highly costly to temporarily light the interior of these containers merely for purposes of loading and unloading of automotive vehicles. Thus, the metal intermodal vehicle containers for transporting of automotive vehicles, heretofore proposed would not be effective and would not be widely used, if at all.

The concept of a reinforced plastic composite container for hauling of automobiles was disclosed in the April, 1990 Edition of the Railway Age Magazine. However, this auto hauling container referred as part of a secured modular automotive rail transport system was not described except only in a very broad concept and did not constitute an operable structure from the description as set forth in this Railway Age Article.

There has been a clear and well-recognized need for an intermodal vehicle hauler which will not suffer from the numerous problems mentioned above. This need includes that of an intermodal vehicle hauler which can be securely sealed to prevent theft, dust invasion and water penetration and unauthorized manual entry and to prevent other environmental damages. Further, there has been a need for an automotive vehicle hauler which will permit at least minimum light, such as daylight exposure to the interior for purposes of facilitating the loading and unloading of vehicles into and from the container. There has also been a need for some intermodal vehicle hauler which can eliminate undesirable vibration zones which damage components of the vehicle hauled and thereby reduce the often severe effects of vibrational damage resulting from travel on railroad cars or automotive vehicle transporting trucks, by using materials which have good stiffness characteristics and good vibration damping characteristics.

OBJECTS OF THE INVENTION

It is, therefore, one of the primary objects of the present invention to provide a reinforced plastic composite intermodal automotive vehicle hauler.

It is another object of the present invention to provide an intermodal automotive vehicle hauler of the type stated which is constructed so that it will allow some sunlight exposure to the interior of the hauler for facilitating the sequence of operations involved in loading and unloading of automotive vehicles.

It is a further object of the present invention to provide an intermodal vehicle hauler of the type stated for transporting automobiles and similar vehicles and which is constructed so that it is relatively light in weight and of substantially lesser weight than a like intermodal container constructed of steel or other structural metal.

It is an additional object of the present invention to provide an intermodal vehicle hauler of the type stated for the transport of automotive vehicles which can dampen the vibration to which the automotive vehicles are normally subjected.

It is still another object of the present invention to provide intermodal vehicle haulers of the type stated which can be constructed at a lower cost than a conventional steel/aluminum structure and which will not result in environmental damage to vehicles carried therein and provide a sealed environmentally enclosed chamber for the transport and storage of automotive vehicles.

It is also an object of the present invention to provide a vehicle hauler of the type stated which will have a long life, will not corrode, is relatively maintenance free, does not require painting or sealing of the skin over its life span and is easy to repair on a site if damaged.

With the above and other objects in view, our invention resides in the novel features of form, construction, arrangement and combination of parts presently described and pointed out in the claims.

BRIEF SUMMARY OF THE INVENTION

A reinforced plastic composite intermodal vehicle hauler for the transport and storage of automotive vehicles such as passenger automobiles, pick-up trucks, vans and the like. The vehicle haulers of the prior art are customarily referred to as "auto haulers". However while the vehicle hauler of this invention is primarily designed for the transport of automobiles, it is not so limited, and is therefore frequently referred to as a "vehicle-hauler".

The vehicle haulers of the present invention are made almost entirely from reinforced plastic composite materials, although some of the connectors and a few of the structural components may be made of metal. Many of those portions which are made of metal are generally encased within a reinforced plastic composite and thus, the vehicle haulers are largely free of rust problems and the like.

The intermodal vehicle haulers of the present invention are generally of a box-like construction, that is they are generally rectangular in shape and comprise a bottom wall or floor, a top wall or roof, a pair of longitudinally extending spaced-apart side walls and end wall portions. Doors are located at one or both of the end wall portions in order to permit loading and unloading of automotive vehicles.

A ramp can be used for driving the automotive vehicles into and out of the vehicle hauler if the haulers are located at an elevated height. However, one of the unique advantages of the present invention is the fact that the vehicle haulers can be located at ground level so that the automotive vehicles can be driven directly into the vehicle hauler and the vehicle haulers can then be crane loaded onto a highway truck, railroad flatbed car or the like.

In the preferred embodiment, each of the walls of the vehicle haulers such as the longitudinal side walls and the roof and floor are constructed of a plurality of aligned and connected reinforced plastic composite panels. Thus, the floor and the roof are each comprised of a plurality of transversely extending longitudinally aligned and connected reinforced plastic composite panels. The side walls are preferably constructed of vertically arranged longitudinally connected reinforced plastic composite side wall panels.

The vehicle haulers of the present invention have been sized with a height such that a pair of vertically stacked vehicle haulers can be loaded onto a highway flat bed truck and still maintain maximum height requirements for passage under bridges and the like. Furthermore, the vehicle haulers have a length such that they will accommodate at least any three standard automotive vehicles, including the full so-called full size automotive vehicles. As a result, the length of these vehicle haulers may be somewhat longer than the conventional standard intermodal container.

The intermodal vehicle haulers of the present invention are provided with connectors in regions so that they can connect to a standard transport such as a railroad car or truck transport and they can also connect to like automotive vehicle intermodal vehicle haulers so that they may be stacked in a vertical array. In addition, the vehicle haulers of the present invention are constructed with connectors in regions so that they can also be connected to standard conventional intermodal transport containers of different lengths.

The intermodal vehicle haulers of the present invention are constructed of the reinforced plastic composite panels, as aforesaid, and these panels generally have a material density so that the overall weight of the reinforced plastic intermodal vehicle hauler is substantially less (at least thirty percent less) than a like container made of substantially the same size of a metal. However, the strength characteristics and particularly tension and compressive strength matches and often exceeds that of a steel container. In this way, transport charges can be reduced.

The vehicle haulers are environmentally sealed and also secured against unauthorized entrance so that they can be stacked on land at a cite of use for temporary storage of the automotive vehicles. This is particularly desirable in urban areas where land costs are high. Usually automotive vehicle dealers are required to maintain a large storage lot, merely for the storage of vehicles. In this case, a large number of vehicles can be stored right in the vehicle haulers and secured against environmental damage and theft. Since they can be stacked, there is an attendant reduction in the needed land space for storage of automotive vehicles.

When the vehicle haulers of the invention are loaded in a sequential line of containers and transported, as for example on successive railroad cars, the air patterns established around the vehicle haulers create a high pressure region approximately in the center of the hauler with lower pressure regions near the forward and reward ends thereof. The vehicle haulers of the invention therefore contain openings in the side walls which function as inlet ports and have filters disposed over these openings. Air enters the vehicle hauler at the inlet port and exits at outlet ports formed at the connector regions at each of the opposite ends of the vehicle hauler. In this way, there is a continuous circulating air which removes fuel fumes or battery acid fumes which might otherwise collect and also removes any dust which may have entered the auto hauler during the vehicle loading and unloading process.

The intermodal vehicle haulers of the invention are also constructed with a floor stiffness so that the potential for harmonic vibration during movement is eliminated. This construction relies upon a specified floor thickness and stiffness which in large measure may be based on the resins used and the fiber density and fiber ply arrangement. The composite will actually dampen (consume or absorb) the energy resulting from vibration during transportation. Thus, the vehicle haulers will actually dampen the harmful vibration of the railroad car or the flat bed truck and hence will reduce the vibration to which the automotive vehicles in the vehicle hauler are otherwise subjected. Finally, the side walls and possibly the roof of the composite material vehicle haulers have the characteristics so that they are light translucent. This enables a light source, such as daylight, to provide adequate daylight to the interior of the vehicle hauler and thereby facilitate the steps involved in the loading and unloading of automotive vehicles from the vehicle hauler.

One of the important aspects in the construction of the automotive vehicle hauler is the fact that they must be relatively light in weight compared to other forms of intermodal metal transport containers. Maintaining a relatively light weight of the vehicle hauler is an exceedingly important consideration since transport costs are largely based upon weight. Hence, when considering the fact that an automotive vehicle may be carried on three different types of transports, reduction can substantially reduce the transport fuel costs and hence the cost for transporting of the automotive vehicles. Further, for the same cost which might otherwise be incurred with a heavier metal automotive hauling container, additional automotive vehicles can be hauled with the haulers of this invention.

In order to provide the necessary strength and stiffness for supporting the vehicles inside of the vehicle hauler, the floor, which is part of a one inch thick envelope, is constructed so that it is relatively thin in cross-section to reduce fabrication costs, and is provided with a plurality of beams or ribs closely spaced apart which extend transversely across the length of the floor wall. These beams or ribs are under the continuous floor skin and are spaced apart at intervals which are less than the vehicle wheel footprint lengths thereof so that each wheel of the vehicle is supported by a minimum of two structural beams under the floor skin.

This invention possesses many other advantages and has other purposes which may be made more clearly apparent from a consideration of the forms in which it may be embodied. These forms are shown in the drawings forming a part of and accompanying the present specification. They will now be described in detail for the purposes of setting forth general principles of the invention, but it is to be understood that this detailed description and the brief description of the drawings is not to be taken in a limiting sense.

BRIEF DESCRIPTION OF THE DRAWINGS

Figure 1:
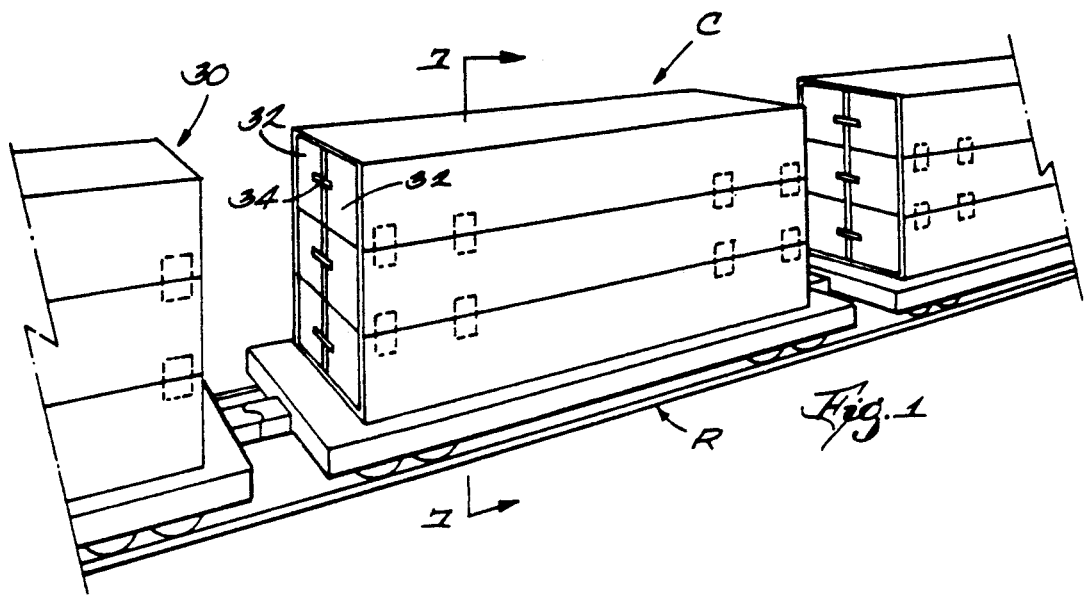
Figure 2:
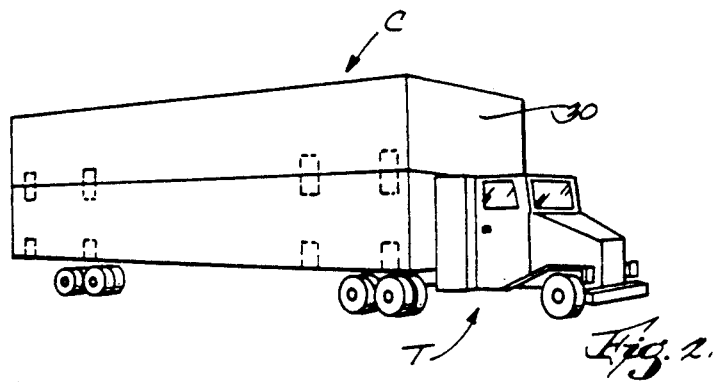
Figure 3:
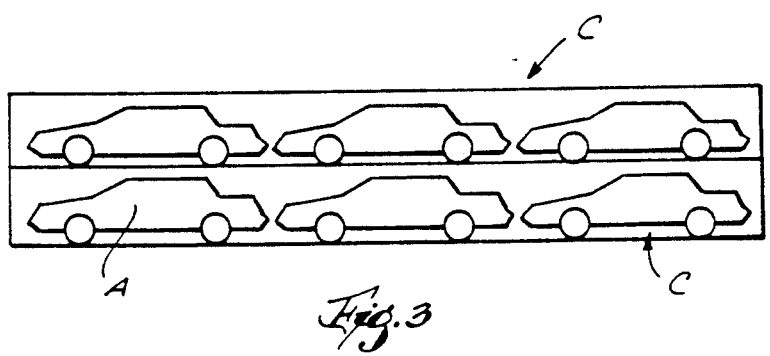
Figure 4:
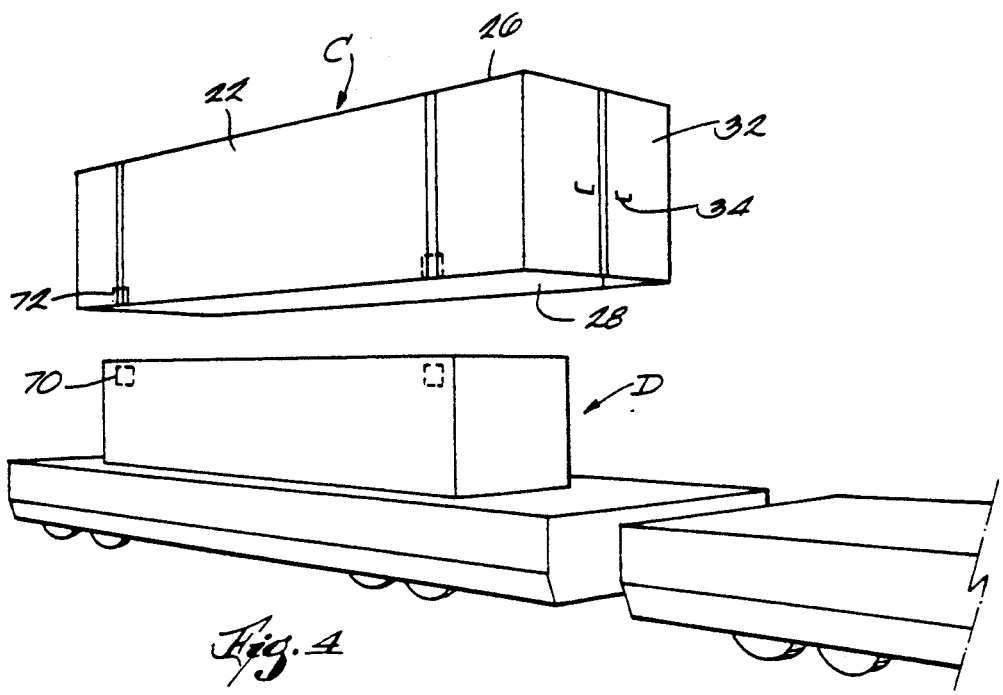
Figure 6:
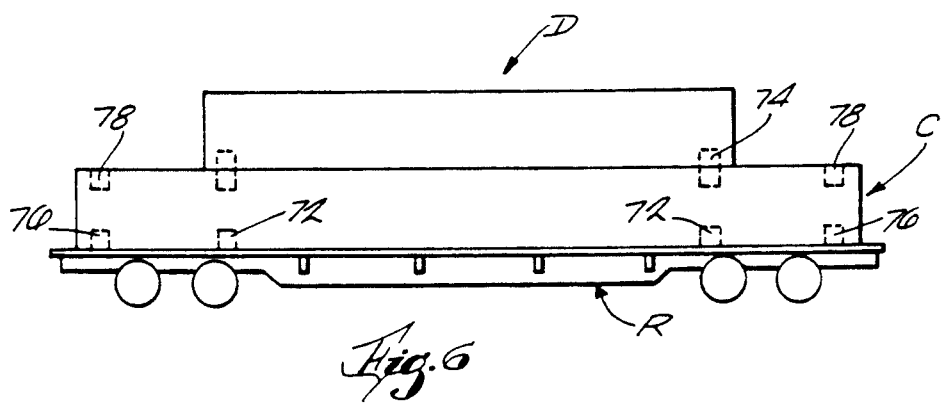
Figure 7:
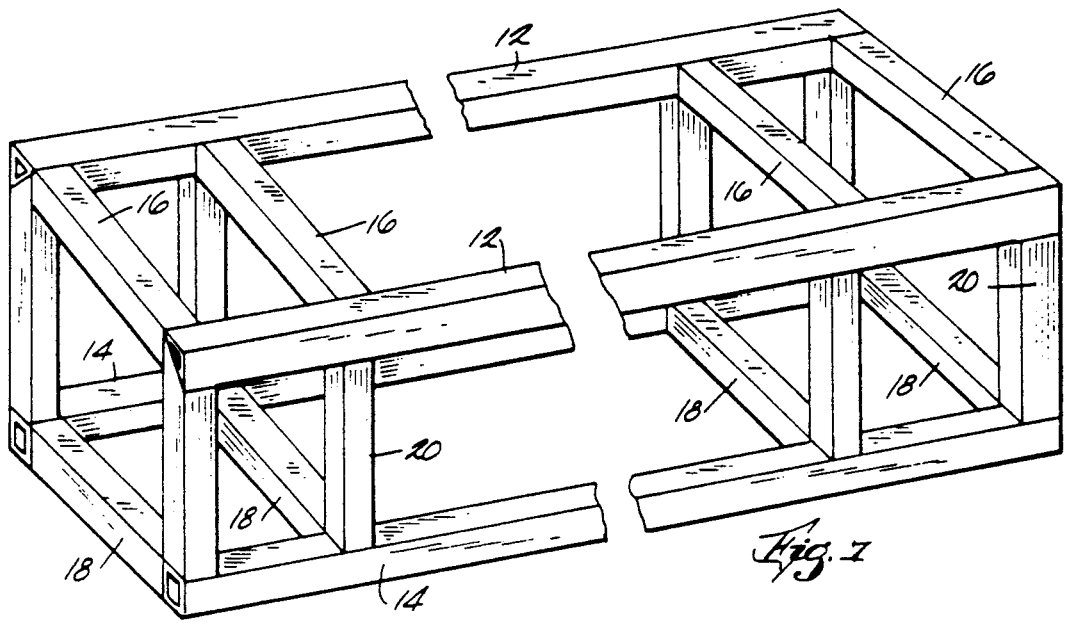
Figure 10:
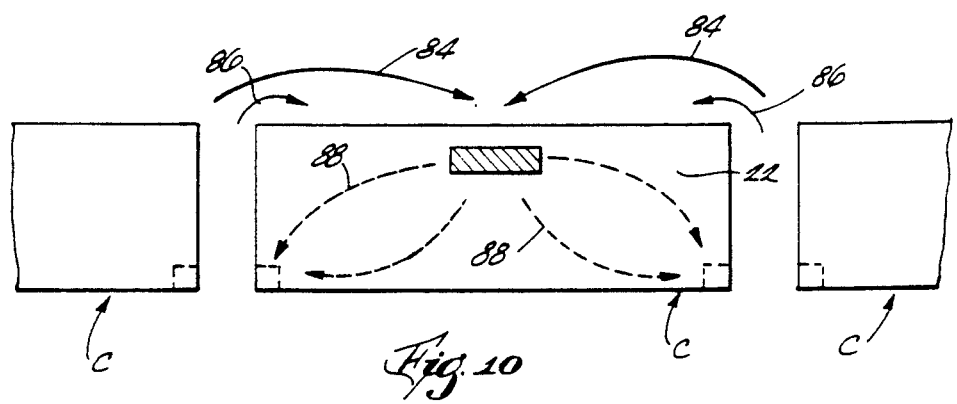
Figure 8:
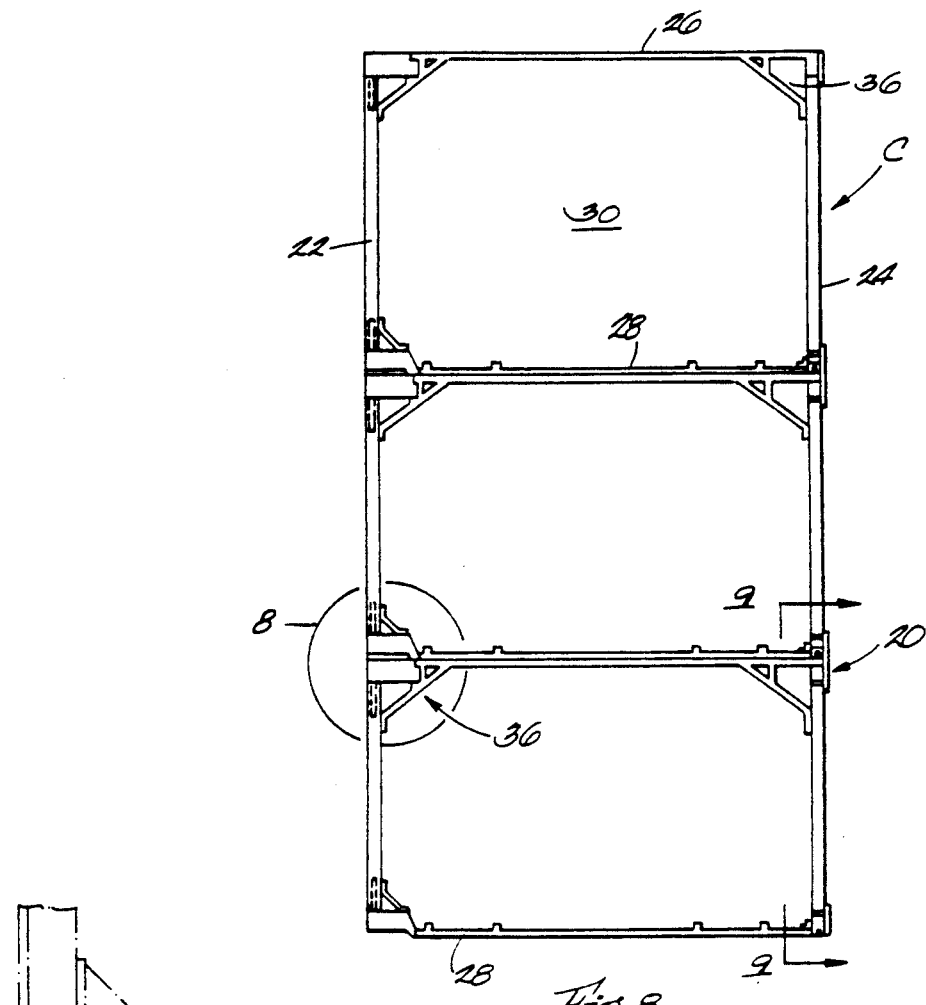
Figure 9:
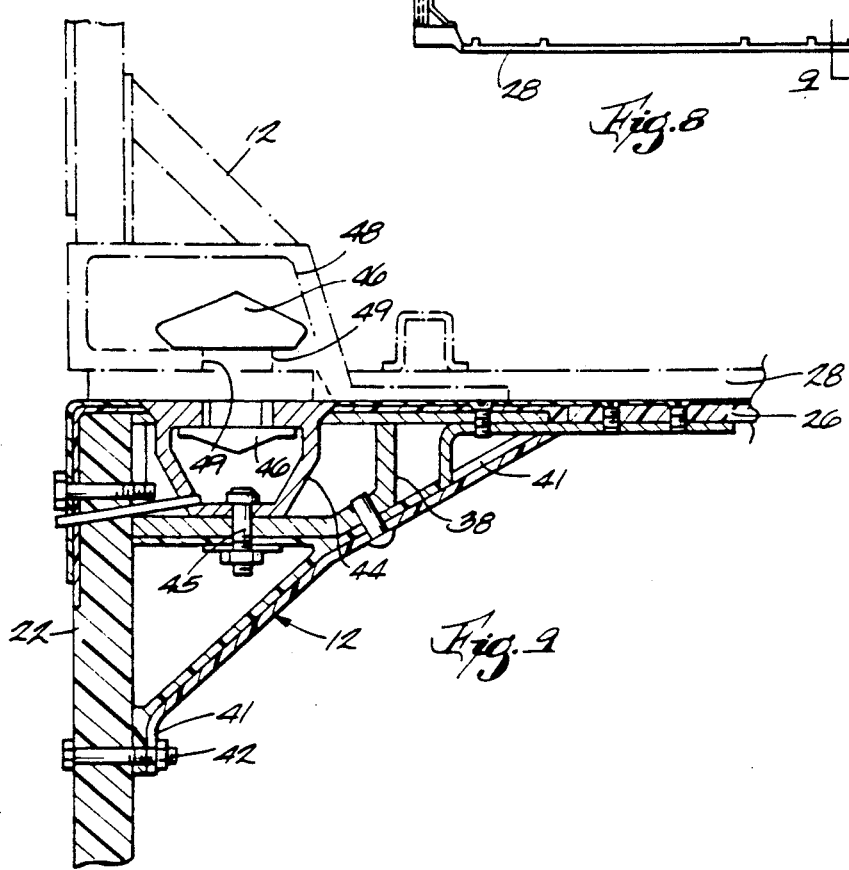
Figure 11:
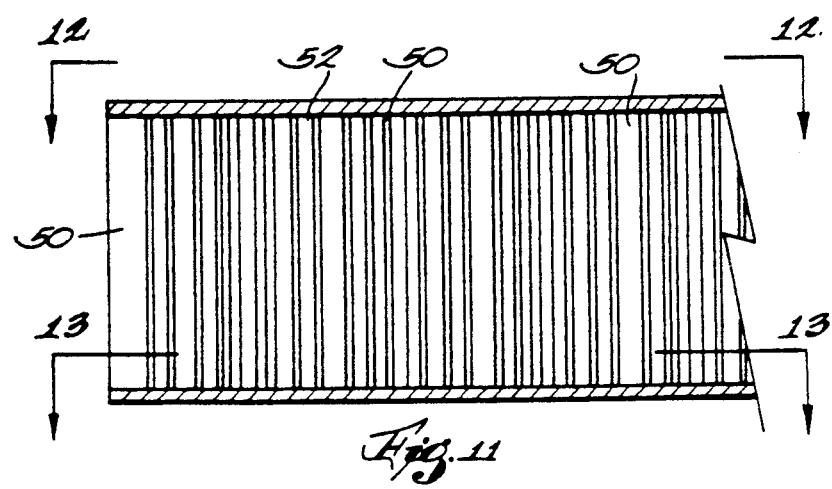
Figure 12:
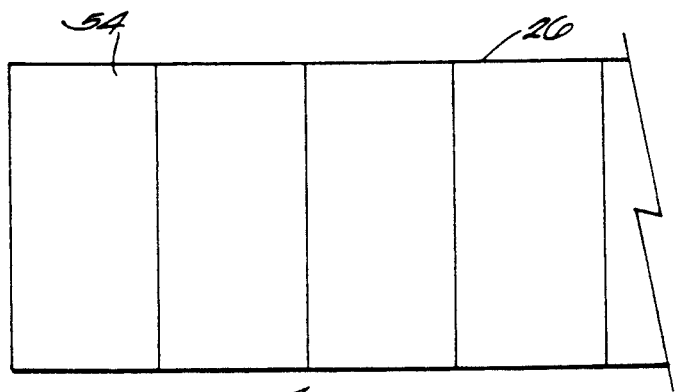
Figure 13:
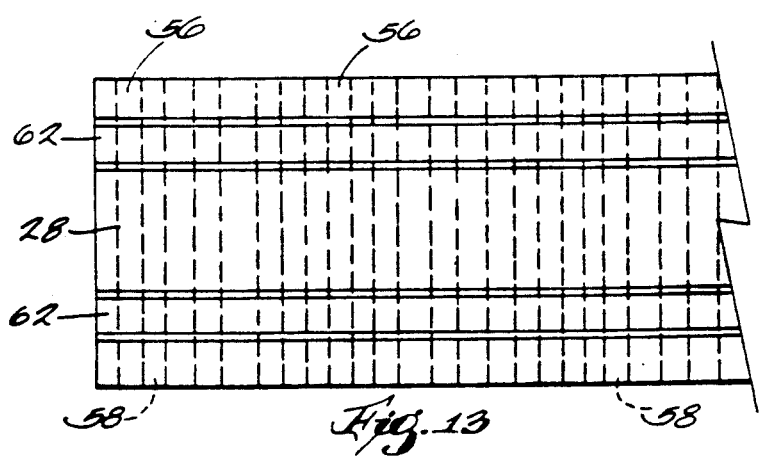
Figure 14:
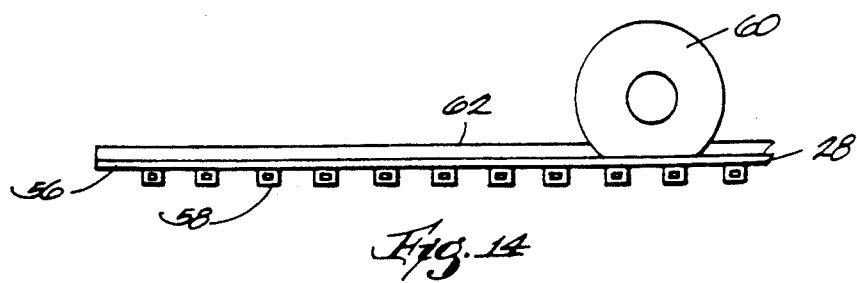
Figure 15:
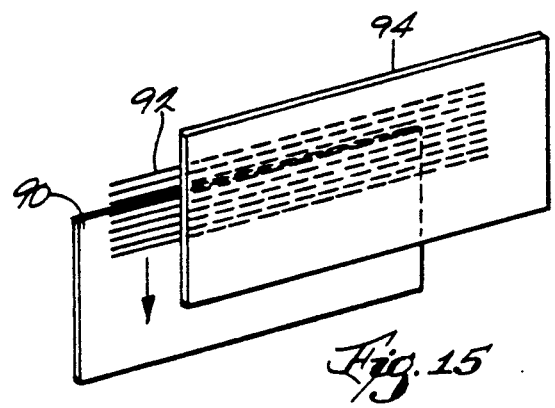
Figure 16:
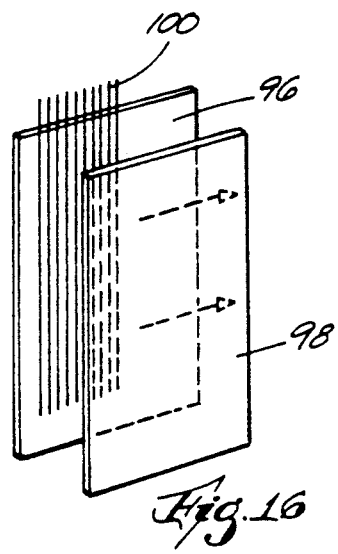
Figure 17:
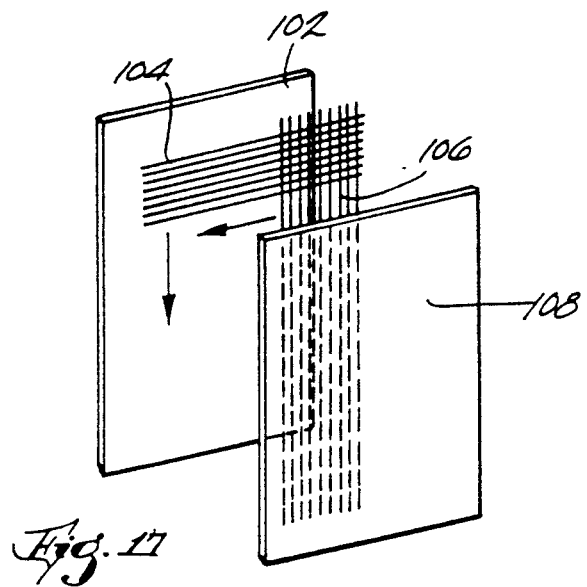

Having thus described the invention in general terms, reference will now be made to the accompanying drawings (seven sheets) in which:

FIG. 1 is a fragmentary perspective view showing three vertically stacked intermodal vehicle haulers of the present invention loaded on railroad flatbed cars;

FIG. 2 is a perspective view showing a pair of intermodal vehicle haulers of the present invention loaded on a conventional truck transport;

FIG. 3 is a schematic side elevational view of a pair of vertically stacked intermodal vehicle haulers of the present invention showing the storage of automotive vehicles therein;

FIG. 4 is a fragmentary perspective view showing the loading of an automotive vehicle intermodal vehicle hauler of the present invention onto a conventional intermodal freight container;

FIG. 5 is a side elevational view showing the loading of a conventional intermodal freight container on a vehicle hauler of the present invention and which is, in turn, secured to a railroad flatbed car and also showing the connector regions therebetween;

FIG. 6 is a side elevational view, somewhat similar to FIG. 5, and showing a conventional intermodal container mounted on an intermodal vehicle hauler of the present invention and with a modified arrangement of connector regions;

FIG. 7 is a perspective view showing the space frame structure forming part of a vehicle hauler of the present invention;

FIG. 8 is an end elevational view of three stacked intermodal vehicle haulers of the present invention and schematically showing the main frame components therefore;

FIG. 9 is an enlarged end elevational view of connector regions of a pair of vertically stacked intermodal vehicle haulers of the present invention;

FIG. 10 is a schematic side elevational view showing three aligned vehicle haulers in an arrangement in which they would be located on railroad cars and the air flow patterns established therebetween;

FIG. 11 is a fragmentary longitudinal sectional view taken through one of the intermodal vehicle haulers of the present invention and showing a plurality of endwise aligned and bonded composite panels forming a side wall thereof;

FIG. 12 is a fragmentary top plan view of a roof of one of the intermodal vehicle haulers of the present invention taken substantially along the plane of line 12—12 of FIG. 11;

FIG. 13 is a fragmentary top plan view of a portion of a floor of one of the intermodal vehicle haulers of the present invention taken substantially along the plane of line 13—13 of FIG. 11;

FIG. 14 is a fragmentary side elevational view of a portion of a floor of the intermodal vehicle hauler with an automotive vehicle wheel located in relationship thereto;

FIG. 15 is a schematic perspective view showing a fiber ply arrangement for one type of panel used in the intermodal vehicle hauler;

FIG. 16 is a schematic perspective view showing a fiber ply arrangement used in another type of panel of the intermodal vehicle hauler; and FIG. 17 is a schematic perspective view of still a further fiber ply arrangement used in yet another panel forming part of the intermodal vehicle hauler of the present invention.

DETAILED DESCRIPTION

Referring now in more detail and by reference characters to the drawings which illustrate a preferred embodiment of the present invention C designates an intermodal automotive vehicle hauler which is constructed primarily of reinforced plastic composite materials. The vehicle haulers C of the present invention have been described as being highly effective for use in the transport and storage of automotive vehicles and particularly, the inter-country transport of such vehicles. However, it should be understood that the vehicle haulers of the present invention are also highly effective for the storage and transport of other forms of freight which should be environmentally protected and also protected against unauthorized pillage or theft.

The intermodal vehicle haulers C of the present invention can be transported easily by railroad cars or by trucks or ocean going ships, as aforesaid. FIG. 1 illustrates three intermodal vehicle haulers C of the present invention stacked on one railroad flatbed car R and three additional intermodal vehicle haulers C of the present invention stacked on an adjacent railroad flatbed car R. In this case, the vehicle haulers C could be secured to flatbed railroad cars or they could be secured to specifically designed railroad transport cars which are specifically designed for the transport of these intermodal vehicle haulers C. FIG. 2 shows a pair of haulers of the present invention on a conventional truck transport T.

The intermodal vehicle hauler of the present invention may also be transported on specially designed railroad cars which are often referred to as "spine cars". For this purpose, the vehicle haulers could be provided with a groove on their underside to accommodate a longitudinally extending upwardly projecting elongate rib or so-called spine on a railroad car. In this case, the spine car could be designed as a triple stack, two-platform articulated railroad car. The floor height would be the same as an existing railroad car and platforms would carry the second and third tiers of the intermodal vehicle haulers. However, the so-called "spine cars" are not the subject of the invention and are therefore neither illustrated nor described in any detail herein.

The intermodal vehicle hauler of the present invention comprises two major structural sub-systems which include (1) a space frame 10; and (2) a large number of reinforced plastic composite skins in the form of walls which extend around the frame. These walls are comprised of endwise connected panels which are preferably rib-reinforced, as hereinafter described in more detail.

FIG. 7 illustrates the space frame structure 10 of the intermodal vehicle hauler of the present invention. In this case, the frame 10 includes two upper longitudinally extending reinforced plastic frame beams 12. These beams 12 are of a triangularly shaped hollow construction as illustrated in FIG. 7 and more fully illustrated in FIG. 9 of the drawings. The main space frame 10 also includes a pair of lower longitudinally extending beams 14 which are also of a hollow construction. However, the beams 14 are generally rectangular in shape. By reference to FIG. 7, it can be observed that the four beams 12 and 14 are located in a rectangular arrangement.

Extending between the upper longitudinally extending beams are cross-beams 16 and similarly extending between the lower longitudinally extending beams 14 or lower cross-beams 18. Finally, connecting the upper and lower portions of the space frame are vertically arranged beams 20 on each of the opposite sides of the space frame. By further reference to FIG. 7, it can be observed that four vertically arranged beams are located on each of the opposed longitudinal sides of the vehicle hauler. These vertically arranged beams 20 are also located in reinforced connector regions, as hereinafter described in more detail.

The reinforced plastic composite panels are then secured to the structural space frame as hereinafter described. These panels which form the walls and the roof and the floor of the vehicle hauler are actually reinforced plastic composite skins, but to some extent, also serve to distribute the load throughout the vehicle hauler. For this reason, the walls and the roof and the floor are rib-reinforced as described herein.

FIG. 8 illustrates an end elevational view (with the end walls or doors removed) of three stacked intermodal vehicle haulers C of the present invention. The intermodal vehicle hauler C is rectangularly shaped, as aforesaid, and comprises a pair of longitudinally extending side walls 22 and 24 connected at their upper ends by a longitudinally extending beam to a longitudinally extending top wall or roof 26 and at their lower ends by a longitudinally extending beam to a longitudinally extending bottom wall or floor 28. Moreover, the vehicle haulers are provided at one end with a pair of end walls 30 having openable doors 32 (FIG. 4). Otherwise the vehicle haulers may have no separate end walls and are enclosed only by openable doors 32. These doors 32 may be conveniently provided with conventional handles and lock mechanisms 34. The handles and lock mechanisms 34 are conventional and therefore neither illustrated nor described in any detail herein.

The vehicle hauler C of the present invention is provided with a plurality of upper connector regions and a plurality of lower connector regions for connecting to conventional transports, such as truck or railroad transports and also to other intermodal containers and other auto vehicle haulers. The exact locations of the connector regions are described in various embodiments hereinafter. However, at each connector region, the upper beams 12, which are of a triangularly shaped hollow construction, as aforesaid, include a metal insert 38. While the beams 12 extend longitudinally for the entire length of the vehicle hauler, the metal inserts 38 only extend longitudinally for a relatively short distance, usually for the length of the connector region and serve primarily to reinforce the connector region.

By reference to FIGS. 8 and 9 of the drawings, it can be observed that a metal strut is connected to the insert 38 and is secured at its upper end to the roof 26 and also to one of the side walls 22 by means of bolts 42. By observing the construction as illustrated in FIG. 9, it can be seen that essentially no metal part is exposed to the interior of the vehicle hauler.

In each of the upper specified connector regions, as hereinafter described, a metal lock receiving bracket or so-called "cap" 44 is secured to and supported by the metal reinforcing insert 38 located within the longitudinally extending beam 12. In this case, the cap 44 is designed to receive a locking mechanism 46 of the type used in conventional intermodal transport containers. The fitting cap 44 is suitably secured to the longitudinally extending metal insert 38 by means of bolts 45, as also best illustrated in FIG. 9. The lower beams 14 include hollow metal reinforcing inserts 48 in the connector regions and are sized to receive one portion of the locking mechanism 46. In this way, the vertically stacked containers may be secured to one another by means of the lock mechanisms 46, each of which have a shank extending through aligned apertures 49 in the cap 44 and the reinforcing insert 48 in the lower beam 12 of the next upper intermodal vehicle hauler.

Each of these side walls 22 and 24 and roof 26 and floor 28 are constructed of a plurality of endwise aligned and connected individual reinforced plastic composite panels. FIG. 11 illustrates a plurality of vertically arranged endwise abutted and connected reinforced plastic composite side wall panels 50. In this case, the panels 50 may be bonded together by a suitable adhesive.

Each of the panels 50 are formed with vertically arranged ribs or so-called stiffeners 52 as shown. These ribs or stiffeners 52 constitute projections which extend outwardly from the face of the panels 50 to receive some of the compressive loading. This enables the use of a panel having a thinner cross-section and a lesser number of layers as well as the avoidance of different cross-ply arrangements. Accordingly, the panels cost less to produce and have a weight which is less than if the panels were constructed with a greater thickness and different cross-ply arrangements.

The roof 26 is also comprised of a plurality of individual endwise abutted and connected panels 54 formed of reinforced plastic composite materials. The roof 26 may also be provided with ribs or stiffeners, similar to the ribs or stiffeners 52 in the side wall panels 50. The ribs or stiffeners are not shown in the roof 26 since the roof can be formed without such ribs.

The panels 50 of the side walls 22 and 24 are uniquely constructed with a selected reinforced plastic composite material and particularly a resin formulation and with consideration given to wall thickness so that the side walls 22 and 24 allow penetration of some sunlight, that is, they are somewhat light translucent. For that matter, the roof of the auto hauler may also be constructed with the material composition as the side walls to afford light penetration through the roof when no other auto hauler is stacked on the roof. In this way, the interior of the intermodal vehicle hauler C is lighted and which clearly facilitates the introduction and removal of automotive vehicles from the container. Thus, due to the fact that sunlight, or for that matter, overhead lights in a loading warehouse or the like, can provide sufficient light to the interior of the vehicle haulers there is no need for a costly and time consuming arrangement of temporary lighting during loading and unloading of the transport containers.

In the formation of the reinforced plastic panels forming part of the side walls 22 and 24, a resin is used which is somewhat clear in order to enable light translucency in the final panels. Even where a dye may be incorporated in the resin, the panels, by virtue of their thickness, namely about 0.1 inch are still somewhat light translucent. It has been found, however, that by maintaining a panel wall thickness within the range of about 0.06 inch to about 0.25 inch and preferably from about 0.08 inch to about 0.20 inch that sufficient light penetration is afforded through the panels to at least partially light the interior of the vehicle haulers. It is also possible to interpose almost completely transparent panels with the other panels used in the assembly of the side walls 22 and 24 to allow greater light transmission to the hauler interior, if desired.

The individual panels 50 in the side walls 22 and 24 function as shear members which interconnect the components of the space frame, as aforesaid. These panels thereby provide for some bending load support and column support and serve to distribute cargo loading. The ribs or stiffeners in the roof panels 54 primarily function to absorb bending loads and to transfer any load on the roof 26 to the side wall panels 50.

FIGS. 13 and 14 illustrate the bottom wall 28 of a vehicle hauler C and which is also comprised of a plurality of individual endwise abutted and connected panels 56. Again, these panels 56 are somewhat similar in construction to the panels 50 in the sidewalls and are transversely extending and abutted with like panels 56 in a longitudinal array of these panels to form the bottom wall 28.

Each of the panels 56 are supported on their undersurface by additional ribs or stiffeners 58. In this case, the ribs or stiffeners 58 are equally spaced apart from each other and may either be an integral part of the panels 56 or they may be separately provided and located on the underside of the floor 28 to support the floor panels 56. In either case, all of the ribs 58 are designed in combination to receive the weight of three automotive vehicles. When, considering the fact that each automotive vehicle could weigh in excess of 4,000 pounds, the ribs 58 along with the floor panels 56 in combination must absorb a loading of at least 12,000 pounds, not including the weight of the transport container. Further, when stacked, additional loading may actually be imposed on the floor 26 of the lowermost container.

In order to maintain a certain thickness of floor panel to thereby reduce weight and more importantly to reduce material costs, the ribs or stiffeners 58 are provided to absorb this load. Furthermore, these ribs or stiffeners 58 are longitudinally spaced apart from each other by a distance which is less than the flattened portion of a wheel tire 60 namely the so-called "footprint" of the tire, on an automotive vehicle, as best shown in FIG. 14. In effect, two ribs will thereupon always support at least the weight of a vehicle imparted by a pair of the wheels of that automotive vehicle.

For purposes of guiding or aligning the automotive vehicles inside of the container, longitudinally extending rails 62 are mounted on the upper surface of the floor 28, as best illustrated in FIGS. 13 and 14. In addition to providing an aid in guiding an automotive vehicle into and out of the container, these longitudinally extending rails provide longitudinal floor stiffness and a gripping surface for wheel chock restraints which may be employed for holding the vehicles in place.

One of the important aspects of the vehicle hauler of the present invention is that it is specifically designed to accommodate and account for the frequencies generated by vibration of a conventional transport, such as a railroad flatcar, when moving. It is well established that various components of an automotive vehicle have differing natural frequencies depending upon the manner in which they are suspended or mounted on the vehicle chassis and the materials from which they are constructed. However, it is also recognized that the natural frequency of most of the components fall within a certain specified range. Accordingly, the vehicle hauler of the present invention must be designed to maintain a frequency distribution within that specified range thereby accommodating the natural frequency of the vehicle components and to dampen frequencies beyond that specified frequency range.

In order to insure a maximum height requirement when three or more vehicle haulers are stacked on one another on top of a railroad flatbed car or a flatbed highway truck, a certain maximum height is permitted for each vehicle hauler. In like manner, in order to maintain a certain desired weight, wall thickness is also constrained. Within these constraints, it has been found that a floor wall thickness of no more than about 1 inch is high satisfactory when the fibers are bound by a polyester resin and particularly when E-glass fibers are employed. Further, with a glass-polyester composite, as well as many other composite combinations, it has been found that the floor thickness, including the thickness of the ribs should not be less than ½ inch and should not be greater than 2 inches. The actual floor skin itself, in the preferred embodiment, has a thickness of 0.188 inch. Here again, this floor skin thickness can very from about 0.08 inch to about 0.3 inch.

The actual design of the floor panel to reduce the unwanted vibration depends to some extent, not only on the thickness, but primarily on the ply schedule, the rib configuration, and the rib location, that is the center to center distantance between the ribs. Again, it has been found that a distance of about 7.15 inches between ribs, center-to-center, is preferred when the rib width is about 3 inches.

If desired, the individual panels forming part of the roof 26 and the floor wall 28 and the longitudinally extending side walls 22 and 24 could be formed by conventional lay-up techniques. However, in order to reduce labor costs and material costs and to enable these panels to be produced on a mass production basis, the process of producing these panels by pultrusion is preferred. Those conventional pultrusion processes described for example, in U.S. Pat. No. 2,871,911 dated Feb. 3, 1959 and in U.S. Pat. No. 3,556,888 dated Jan. 19, 1971 both by William Brandt Goldsworthy could be used to produce the panels.

In a preferred embodiment, the transport containers of the invention are modular and have a weight of about 7,100 pounds. Their height is approximately 5.25 feet, their width is approximately 8.5 feet and their length is approximately 53 feet.

The composite materials used in the formation of the reinforced plastic composite panel are well known. Generally any filamentary reinforcing material, such as Fiberglass, carbon, boron, quartz or quartz fibers or for that matter grown whisker crystals may be employed.

Any of a number of commercially available resins or other binders can also be employed for impregnating the fiber material.

The binders should be capable at some stage of the process, of being liquified and softened for a period of time and should also be sufficient to flow around the filaments. Further the binder or matrix should be capable of achieving a rigid stage upon complete polymerization to become a rigid solid and possess the ability to adhere to the reinforcing material. Some of the suitable binders which can be employed are for example, the thermoplastic resins, such as polypropylene, polycarbonates, etc. In addition, some thermosetting resins, such as the polyesters and vinyl esters can be used. Many of the phenolics and epoxys can be used as well.

FIG. 3 shows three automobiles A stored within each intermodal vehicle hauler C and with a pair of the haulers C in a stacked arrangement. For this purpose, in order to accommodate a few standard length large sized and commercially available automotive vehicles, the intermodal vehicle hauler has a length which is somewhat longer than conventional intermodal transport containers.

FIG. 4, shows for example, the intermodal vehicle hauler C of the present invention being loaded onto the upper surface of a conventional standard intermodal container D. The connector regions of the standard conventional intermodal containers D are typically located at each of the transverse ends thereof and usually on opposite longitudinal sides of the containers FIG. 4 illustrates in dotted lines connector regions 70 at the upper edges of the conventional container D. In like manner, FIG. 4 also illustrates in dotted lines, the connector regions 72 in the intermodal vehicle hauler C of the present invention adjacent one of the longitudinal side walls. In like manner, such connector regions 72 would also exist on the opposite longitudinal side wall. In this case, it can be observed that the connector regions 72 are aligned to be connected with the connectors at the connector regions 70 on the conventional intermodal containers D.

The location of the connectors in the present invention is an important consideration. FIG. 5 illustrates one of the intermodal vehicle haulers C of the present invention on a conventional railroad flatbed car R. The intermodal hauler C is provided with lower connector regions 72 spaced inwardly from the ends of the haulers C and upper connectors 74 also spaced inwardly from the ends of the haulers. In this way, the intermodal vehicle hauler C can connect to conventional containers D and like intermodal vehicle hauler C therebeneath and thereabove.

The length of an intermodal hauler C of the present invention is about 53 feet, as aforesaid. However, the length of a standard intermodal freight container D is about 40 feet. Accordingly, the connector regions of the vehicle hauler C of the present invention are spaced inwardly from the ends at about a distance of 6½ feet at each end. Thus, when the intermodal vehicle hauler C of the present invention is stacked on top of a conventional intermodal freight container D, the connectors of the container C will align with the connectors on the conventional intermodal freight container D, even though a portion of the vehicle hauler C will protrude beyond the ends of the conventional intermodal container D.

FIG. 6 also illustrates a standard intermodal freight container D disposed above and mounted on the upper surface of the intermodal vehicle hauler C of the present invention. The embodiment of intermodal vehicle hauler C of the present invention includes two pairs of lower connectors at lower connector regions 72 spaced inwardly from the ends of the vehicle hauler C for connection to standard length intermodal containers D and to conventional rail and truck transports. The vehicle hauler C of the present invention in this embodiment similarly includes connectors at upper connector regions 74 spaced inwardly from the ends of the vehicle hauler C for connection to standard intermodal containers.

In the embodiment of the vehicle hauler C of the present invention, illustrated in FIG. 6, the vehicle hauler C also includes a pair of lower connector regions at the ends of the vehicle hauler and a pair of upper connector regions at the ends of the vehicle hauler C of the present invention. In this way, the vehicle hauler C of the present invention can stack on like containers of the present invention with connectors at the ends thereof. Further the vehicle haulers C of the invention can also connect to conventional intermodal freight containers with inner connectors at the connector regions 72 and 74.

It is important to maintain a ventilation of the interior of each of the auto haulers without introducing dust and other foreign particles from the environment external to the vehicle hauler. For this purpose, each of the side walls 22 and 24 have a window or small opening 80 somewhat centrally located and proximate the upper end thereof, as best shown in FIG. 10. This window functions as an air inlet port and is provided with a filter 82.

It has been found that when a plurality of endwise arranged vehicle haulers C are disposed on successive moving railroad flatbed cars, that an air pattern causing a high pressure area is established near the center portion of the auto hauler C. In this case, the arrows 84 illustrate the air flow arrangement from the ends of the cars towards the center portion thereof. In fact, there is somewhat of a vacuum caused between the various vehicle haulers C as shown by the arrows 86 representing air flow.

The high pressure area at the center of the vehicle hauler causes an air flow into the interior thereof. The air entering the interior causes an air flow pattern generally illustrated by the dotted lines 88. In this case, the air flow from the window 80 toward outlets at the connector regions that is, at each of the ends of the vehicle hauler will remove any dust particles which may have settled on the automotive vehicles while loading the vehicle hauler. This will also remove any dust or similar particles on the floor of the vehicle hauler. Since the areas between the vehicle haulers constitute low pressure areas, there will be a natural air flow through the vehicle hauler from the upper center portion toward the lower end portions.

This air flow is also important in that it will serve to remove any dangerous accumulation of fuel fumes. Furthermore, the air flow will also serve to remove any battery acid fumes which would otherwise accumulate and etch the paint on the automotive vehicles.

It can be observed that the intermodal vehicle haulers C of the present invention are highly versatile in that they can be mounted to existing connector arrangements on existing intermodal transport vehicles, such as trucks, railroad cars, ships and the like. Furthermore, the intermodal vehicle haulers C are highly effective in that they can be coupled to like intermodal vehicle haulers of this invention.

The vehicle haulers of the present invention are designed so that they can be used with conventional metal vehicle haulers. Several railroads have three-tier metal framed vehicle haulers in which the automotive vehicles are driven up ramps into the various levels of the hauler and through successive haulers to the forwardmost of the haulers. The vehicle hauler of the present invention is capable of accepting the conventional ramp used between the conventional commercially available metal vehicle haulers presently being used by railroads. Thus, the use of the reinforced plastic composite vehicle haulers of the invention will not inhibit the use of the conventional metal vehicle haulers in combination with the vehicle haulers C.

Another one of the distinct advantages of the vehicle haulers of the present invention is the fact that they can be repaired at an on-site location in the event of body damage or the like. If a metal vehicle hauler of the commercially available type is damaged, it must be removed from service and repaired at a factory location. Due to the fact that a reinforced plastic composite can be repaired by patching, this repair can be conducted at a site of damage or other location without removing the vehicle hauler from service.

In order to achieve the necessary strength characteristics but to maintain a low cost and low weight structure, relatively thin reinforced plastic composites skins are used, as aforesaid. The present invention also provides a unique fiber ply arrangement for certain of the panels used in the intermodal vehicle haulers of the present invention. However, it should be understood that these fiber ply arrangements as set forth could be used in essentially any type of intermodal container or other structure and is not necessarily limited to use in the vehicle haulers of the present invention.

FIG. 15 illustrates in schematic form a type of fiber ply arrangement used in the panels forming part of the roof 56 and includes a sandwich structure comprised of an outer mat of fiber 90. The roof panels also include a second layer of transversely oriented fibers 92. Finally, a fiber containing woven mat 94 is applied to the sandwich structure. Thus, one or more individual layers of fibers, such as Fiberglass, can be deposited in the transverse direction, that is, transverse to the container with woven mats disposed on each of the opposite sides.

FIG. 16 illustrates the fiber ply arrangement for the side wall panels 22 and 24. This fiber ply arrangement comprises an outer sheet of woven mat 96 and a second outer sheet of woven mat 98 similar to the sheets 90 and 94. Disposed within the mats 96 and 98 are vertically arranged fibers 100. Here again, one or more layers of these vertically arranged fibers may be employed depending upon the desired thickness in the panels to be formed.

FIG. 17 illustrates the fiber ply arrangement used in the floor panels of the intermodal vehicle hauler. In this case, the floor panels are each comprised of an outer layer of woven mat fiber 102 along with a second layer containing transversely oriented fibers 104. These panels also contain longitudinally arranged fibers 106 and which are then covered by an outer woven mat 108.

The panels according to FIG. 17 are highly effective in that they contain fibers both in the longitudinal (X) direction and in the transverse (Y) direction. While it would be desirable for purposes of increased strength, to add fibers in 45 degree plys, these plys have been eliminated for cost savings and weight reduction, and the ribs have been employed on each of the panels. However, it has been found that by using this type of ply arrangement in the panels that adequate strength is still afforded.

The ribs in each of the aforesaid panels are also made with essentially the same fiber ply arrangement as used in the formation of the skins of these panels. However, the ribs may have a somewhat greater thickness as in the case of the ribs forming part of the floor panels.

With regard to the floor panels, it should be understood that the various one or more layers of the "X" direction fibers and the one or more layers of the "Y" direction fibers could be mixed such that one layer of the "X" direction fibers is formed by a layer of the "Y" direction fibers, etc. However, it is possible to first deposit all layers of the "X" direction fibers and thereafter followed by all layers of the "Y" direction fibers.

Thus, there has been illustrated and described a unique and novel intermodal vehicle hauler which is constructed primarily from reinforced plastic composites and which is highly effective for the transport and storage of automotive vehicles. These vehicle haulers of the present invention eliminate the numerous problems attendant to the transport and delivery of automotive vehicles and to the use of proposed metal transport containers. The present invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A reinforced plastic composite intermodal vehicle hauler for the transport and storage of automotive vehicles, said vehicle hauler comprising:
   (a) a pair of opposed side walls,
   (b) a pair of opposed ends extending between said side walls with an openable door at at least one of the ends,
   (c) a floor formed of a reinforced plastic composite material, said floor extending between said side walls,
   (d) a roof formed of a reinforced plastic composite material, said roof extending between said side walls, and
   (e) said side walls each being comprised of a plurality of aligned and connected panels, each of said panels including integrally formed ribs, and each of said panels being formed of a reinforced plastic composite material having the characteristics and thickness so that said side walls are at least partially translucent to enable some light to pass through to the interior of said vehicle hauler for facilitating loading and unloading and chocking and unchocking of automotive vehicles.

2. The reinforced plastic composite intermodal vehicle hauler of claim 1 further characterized in that the floor and roof include a plurality of connectors to enable stacking of multiple haulers and connecting same to one another.

3. The reinforced plastic composite intermodal vehicle hauler of claim 1 further characterized in that the roof and floor are each constructed from a plurality connected reinforced plastic composite panels.

4. The reinforced plastic composite intermodal vehicle hauler of claim 1 further characterized in that said reinforced plastic composite material includes a filamentary reinforcing material and a binder material, and each of said roof and said floor includes a plurality of aligned and connected panels, each of the panels in said floor and each of the panels in said roof being made of a reinforced plastic material and including integrally formed ribs.

5. A container apparatus for use in transporting and storing automotive vehicles, said container apparatus comprising:
   a frame;
   a plurality of walls mounted on said frame, the walls including a top wall, opposed end walls, a bottom wall, and opposed side walls, each of said side walls being made of a reinforced plastic composite material including a filamentary reinforcing material and a binder material, said reinforced plastic composite material having the characteristics and thickness so that said side walls are at least partially translucent to enable light to pass through to the interior of said container apparatus, and connector means supported on said frame for connecting said container apparatus in vertically stacked relation with other containers having corresponding connector means.

6. A container apparatus as set forth in claim 5 wherein said filamentary reinforcing material is selected from the group consisting of fibers of glass, carbon, boron and quartz, and wherein said binder material is selected from the group consisting of resins, phenolics and epoxies.

7. A container apparatus as set forth in claim 5 wherein each of said side walls includes a plurality of interconnected panels, each of said panels being made of said reinforced plastic composite material, and wherein each of said panels includes a portion having a thickness in the range of about 0.06 inch to 0.25 inch to permit light to pass therethrough.

8. A container apparatus as set forth in claim 5 wherein each of said side walls includes a plurality of interconnected panels, each of said panels being made of said reinforced plastic composite material, and each of said panels including integrally formed reinforcing ribs.

9. A container apparatus as set forth in claim 8 wherein said frame includes a pair of upper longitudinal beams, a pair of lower longitudinal beams, and a plurality of vertically extending beams interconnecting said upper and lower longitudinal beams, and wherein each of said beams is made of a reinforced plastic composite material.

10. A container apparatus as set forth in claim 8 wherein each of said top wall and said bottom wall includes a plurality of panels each made of said reinforced plastic composite material, and wherein said bottom wall includes means for supporting the weight of an automotive vehicle, said means for supporting including a plurality of ribs formed integrally with the panels in said bottom wall.

11. A reinforced plastic composite intermodal vehicle hauler for the transport and storage of automotive vehicles, said container comprising:
(a) a pair of opposed side walls formed of a reinforced plastic composite,
(b) a pair of opposed ends extending between said side walls with an openable door at at least one of said ends,
(c) a floor formed of a reinforced plastic composite,
(d) a roof formed of a reinforced plastic composite material,
(e) a first pair of connectors on said floor and a first pair of connectors on said roof and spaced inwardly from one end of each of said roof and floor,
(f) a second pair of connectors on said floor and a second pair of connectors on said roof and being spaced inwardly form the opposite ends of said floor and roof, said first pair of connectors being spaced from said second pair of connectors by a distance approximately equal to the distance between connectors on conventional intermodal containers for connection to standard conventional containers or other vehicle haulers, and
(g) said side walls each being comprised of a plurality of aligned and connected composite panels, said panels of said side walls being formed of a reinforced plastic composite material which has the characteristics and thickness so that they are at least partially translucent and enable some light to pass through to the interior of the vehicle hauler for facilitating loading and unloading and choking and unchoking of automotive vehicles, each of said panels being comprised of:
  (1) a skin having a first outer layer of a fiber containing woven mat,
  (2) said skin also having a second layer of strands of fiber all oriented in the same direction which is either an "X" direction or a "Y" direction,
  (3) a third outer layer of fiber containing woven mat, and
  (4) ribs on said panels to reinforce the panels to accept loading thereon.

12. A reinforced plastic composite intermodal vehicle hauler for the transport and storage of automotive vehicles, said vehicle hauler comprising:
(a) a pair of opposed side walls formed of a reinforced plastic composite,
(b) a pair of opposed ends extending between said side walls with an openable door at at least one of the ends,
(c) said side walls each having a window located approximately at the center thereof and adjacent an upper end thereof to permit air flow into the interior of the hauler,
(d) relatively small discharge openings at the ends of said hauler permitting exit of the air from the hauler interior thereby creating an air flow across said hauler's interior,
(e) a floor formed of a reinforced plastic composite material comprised of a plurality of longitudinally aligned and connected reinforced plastic composite panels, said floor also having a thickness such that harmonics substantially beyond the natural frequency of the vehicle component as caused by vibration during movement are substantially dampened, thereby reducing vibration of components of the automotive vehicles in the vehicle hauler,
(f) a plurality of reinforcing ribs at said floor and extending transversely thereof, said ribs being spaced apart by a distance which is less than the foot print of a vehicle wheel and tire supported by the floor so that each wheel of a vehicle is supported by at least a pair of ribs,
(g) a roof formed of a plurality of aligned and connected reinforced plastic composite material panels,
(h) a first pair of connectors on said floor and a first pair of connectors on said roof and spaced inwardly from one end of each of said roof and floor,
(i) a second pair of connectors on said floor and a second pair of connectors on said roof and being spaced inwardly form the opposite ends of said floor and roof, said first pair of connectors being spaced from said second pair of connectors by a distance approximately equal to the distance between connectors on conventional intermodal containers for connection to standard conventional containers or other vehicle haulers thereby enabling said vehicle hauler to be stacked on or below intermodal haulers of similar construction and with conventional intermodal containers and so that the composite intermodal vehicle hauler can be stored on land or transported by seal, rail and truck,
(j) said reinforced plastic composite materials used in the formation of said panels being of a thickness such that the overall weight of the reinforced plastic composite intermodal vehicle hauler is substantially less than a like container of substantially the same size of metal, and (k) said side walls each being comprised of a plurality of aligned and connected composite panels, said panels of said side walls being formed of a reinforced plastic composite which has the characteristics and thickness so that they are at least partially translucent to enable some light to pass through the interior of the vehicle hauler for facilitating loading and unloading and choking and unchoking of automotive vehicles.

* * * * *